United States Patent [19]

Miura et al.

[11] Patent Number: 4,576,459
[45] Date of Patent: Mar. 18, 1986

[54] EYE-CUP FOR CAMERA

[75] Inventors: Yuzo Miura; Akira Yamada, both of Tokyo, Japan

[73] Assignee: Canon Kabushiki Kaisha, Tokyo, Japan

[21] Appl. No.: 571,471

[22] Filed: Jan. 17, 1984

[30] Foreign Application Priority Data

Jan. 31, 1983 [JP] Japan ............................. 58-12560[U]

[51] Int. Cl.⁴ ............................................. G03B 11/04
[52] U.S. Cl. .................................... 354/287; 350/579
[58] Field of Search ............... 354/219, 223, 287, 295; 350/579–581; D16/1, 6

[56] References Cited

U.S. PATENT DOCUMENTS 2,572,915 10/1951 Devine ................................. 354/287
3,390,931 7/1968 Luning et al. ........................ 350/579
3,583,300 6/1971 Johnson et al. ...................... 354/219
3,842,431 10/1974 Sakuma ............................... 354/287
4,119,984 10/1978 Zajac .................................... 354/219

FOREIGN PATENT DOCUMENTS 14224 of 1907 United Kingdom ................ 350/579
112989 2/1918 United Kingdom ................ 350/579

Primary Examiner—John Gonzales
Attorney, Agent, or Firm—Toren, McGeady, Stanger, Goldberg & Kiel

[57] ABSTRACT

An eye-cup attached to an eye-piece frame provided at a rear-part of a camera, in which at least a portion of an outer wall of the eye-cup is formed on an external surface so as to match with an external surface of the camera.

16 Claims, 6 Drawing Figures

EYE-CUP FOR CAMERA

BACKGROUND OF THE INVENTION

1. Field of the Invention

The present invention relates to an improvement of an eye-cup for a camera.

2. Description of the Prior Art

When a photographer looks through a view finder in a single lens reflex camera, sometimes external light enters into the view finder from the eye-piece and the image of an object formed on a focus plate becomes difficult to observe. An eye-cup having a hood shape to be attached to an eye-piece frame for shielding such external light has been known to date. Such an eye-cup may constitute an obstacle when a photographer wearing glasses looks through the view finder, and therefore if the photographer moves his eye away from the eye-piece, sometimes he cannot have a sufficient view within a field of vision of the view finder.

For obtaining a better field of vision through an eye-piece, an eye-piece of a large size may be used. But, since a back-lid which can be opened and closed and an accessory shoe for mounting an accessory, etc. are provided close to each other at a back plane of a camera in ordinary cases, a large eye-cup generates such shortcomings since it becomes an obstacle to convenient operation of the camera and detracts from the portable characteristic thereof. Also, conventional eye-cups have the function of assisting easy observation of a field of vision through an eye-piece only, but not the function of preventing damage to the camera body.

SUMMARY OF THE INVENTION

The present invention comprises an eye-cup for a camera, which can be used for preventing damage to a corner portion of a camera body and which has sufficient features to enable it to function satisfactory as an eye-cup. Therefore, in the present invention, an eye-cup attached to an eye-piece frame is made of material which is relatively soft and elastic with its outer wall forming a hood part being made to virtually match with the external form of an upper cover of a camera so that a ridge portion of the upper cover which is most susceptible to damage within a camera can be protected.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DESCRIPTION OF THE PREFERRED EMBODIMENTS

Figure 1:
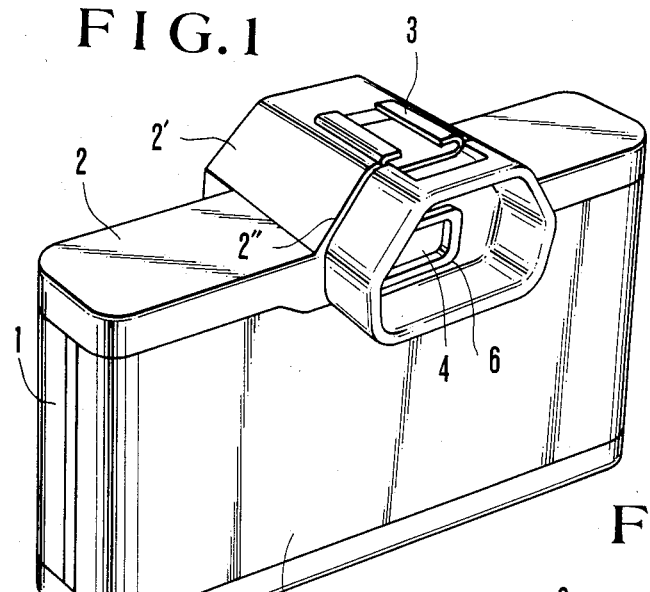
FIG. 1 is an oblique view showing the manner in which an eye-cup is mounted.
Figure 2:
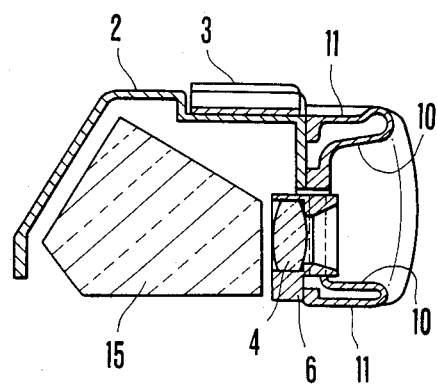
FIG. 2 is a vertical cross-section an eye-cup.
Figure 3:
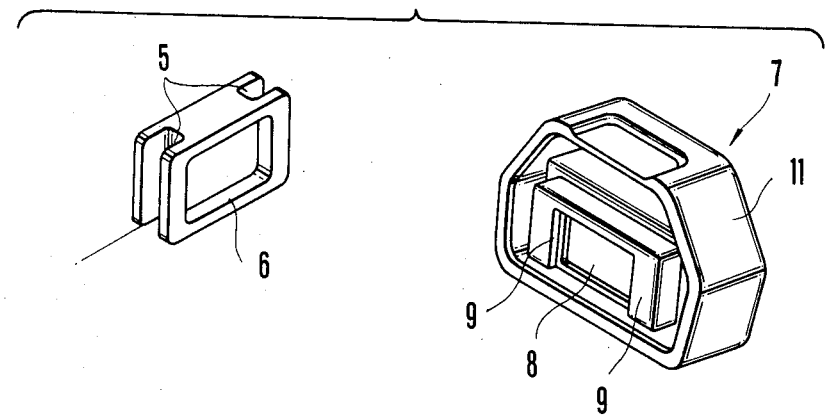
FIG. 3 is an oblique view showing the state of an eye-cup when it is taken out of an eye-piece frame.

FIG. 1 is an oblique view showing a single lens reflex camera viewed from the rear thereof, comprising a camera body 1, and an upper cover 2 installed to an upper part thereof, with a part 2' covering a pentagonal prism of a view finder which protrudes out of other parts, and also with an accessory shoe 3 fixedly provided at an upper plane thereof. A black lid 16 is attached to a rear part of the camera body 1 in a manner allowing opening and a closing thereof by hinges (not shown) and a bottom cover 17 is provided for the camera. As shown in FIG. 2, a view finder eye-piece lens 4 is held in place by an eye-piece frame 6 at a rear of the pentagonal prism 15. The eye-piece frame 6 is fixed to the camera body 1 and has concave grooves 5 extending in the vertical direction formed at both sides thereof as shown in FIG. 3. An eye-cup 7 to be attached to the eye-piece frame, is formed with material having softness and elasticity such as rubber, synthetic rubber, etc. Further, a see-through window 8, which directs light passing through the eye-piece lens 4 to the outside, is formed at a central part thereof. Furthermore, a rib 9 which is fitted into the concave grooves 5 is formed at the eye-piece frame 6. The eye-cup 7 also has a light shielding hood part, which surrounds the see-through window, formed therein with an inner wall 10 extended to the rear from the see-through window 8 and an outer wall 11 which is folded back in a U-shape from a fore end of said inner wall and is extended forward. The external shape of an upper half part of the outer wall 11 matches with the shape of the view finder cover part 2' of the upper cover 2 mentioned above, and a lower part thereof is formed so as not to touch an upper edge of the back-lid 16 when the back lid 16 is opened and closed.

As has been explained above, when the eye-cup 7 shown in this embodiment is mounted on the eye-piece 6 installed at the camera body 1, the outer wall 11 of said eye-cup 7 will be matching with an external surface of the upper cover 2 of the camera body 1, and therefore an effect is achieved such that damage of a ridge 2'' of the upper cover 2 is prevented by the eye-cup 7. Also, the eye-cup 7 has a double wall structure with the inner wall 10 and the outer wall 11 and is formed to have a hollow structure, and thus the effect is to provide better form-retention characteristic and better softness.

Figure 4:
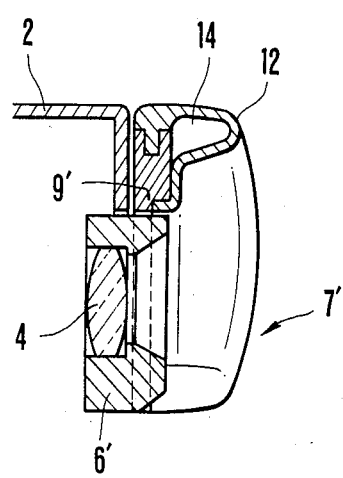
FIG. 4 is a cross-section of an eye-cup comprising another embodiment of the present invention.
Figure 5:
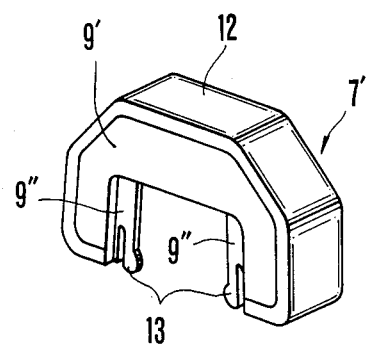
FIG. 5 is an oblique view of the eye-cup in FIG. 4.

FIGS. 4 and 5 show another embodiment of an eye-cup according to the present invention, wherein an eye-cup 7' in this embodiment is made by plastic molding and has an engagement member 9' having a rib 9'' so as to engage with the eye-piece frame 6 and edges of a soft eye-cup body 12 formed in the same manner as in the preceeding embodiment are made to be fixed to an outer part of the engaging part made of a plastic molded member. Therefore, according to this embodiment, the rib 9' to be engaged with the eye-piece frame 6' can be formed with relatively hard member, and since projections 13 for preventing dislocation are provided as shown in FIG. 5, the eye-cup can be mounted in a secure manner, with prevention of a dislocation of the eye-cup being effectively prevented. Further, in this embodiment, since a complete hollow part 14 is formed within said eye-cup body 12 with the eye-cup body 12 and the molded member 9', a high level of air-tightness can be secured, so that the elasticity of the eye-cup body can be enhanced.

Figure 6:
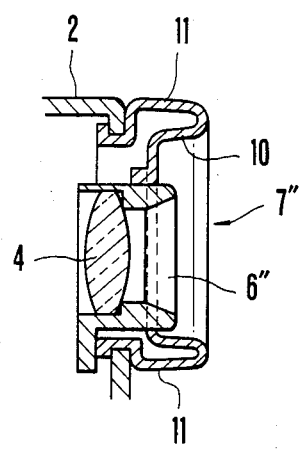
FIG. 6 is a cross-section of an eye-cup comprising still another embodiment of the present invention.

FIG. 6 shows an embodiment in which edges of the inner wall 10 constituting an eye-cup 7" are insertedly fitted with an eye-piece frame 6" and edges of outer wall 11 of the eye-cup are insertedly fitted with the upper cover 2, wherein such an arrangement may be provided that the eye-cup cannot be removed. In this case, although the eye-cup cannot be removed, there are advantages in that intrusion of dust into the finder or the camera body can be prevented and that the waterproofness of the eye-piece part can be improved because of the improved air-tightness between the upper cover 2 and the eye-cup.

Also, while a single lens reflex camera is used in the embodiments mentioned above, the present invention can be similarly applied to a camera having a range finder and to a camera having an accessory such as an eye-piece part of a waste level view finder.

As has been explained above the present invention relates to an eye-cup which has at least a portion thereof formed an external surface matching with an external surface of a camera, and therefore advantages can be provided such that a ridge forming a portion of the external shape of the camera can be protected from impact, etc., and peeling off of the coating or damage of the ridge part can be prevented. Further, the risk can be eliminated that a photographer's face hits the ridge part. Also, when this eye-cup is mounted on a camera body, said eye-cup and the camera body can have a unity of appearance, thus providing great advantage in enhancing the design of the camera.

While specific embodiments of the invention have been shown and described in detail to illustrate the application of the inventive principles, it will be understood that the invention may be embodied otherwise without departing from such principles.

What we claim:

1. An eye-cup for a camera having a projection formed on the contour for mounting viewfinder optics and a viewfinder, comprising:
    an engagement part to be mounted in the neighborhood of the projection of the camera;
    a see-through window for directing light from the eyepiece of the camera; and
    an outer face part surrounding said see-through window so as to form a light shielding hood; said outer face part being formed so as not to protrude beyond the contour of said projection with at least a part of said outer face part being made to coincide with said contour of the projection of the camera.

2. An eye-cup according to claim 1, wherein the outer face part of the eye-cup is formed so as to extend along the direction of the optical axis of the viewfinder.

3. An eye-cup according to claim 1, wherein said camera includes an eyepiece frame of the camera and wherein said engagement part of the eye-cup engages with said eyepiece frame of the camera.

4. An eye-cup according to claim 3, wherein said engagement part is formed like a rib.

5. An eye-cup according to claim 3, wherein at least the outer face part of said eye-cup is formed of a soft and elastic material.

6. An eye-cup for a single lens reflex camera having a projection formed on the contour for mounting a pentagonal prism as viewfinder optics, comprising:
    an engagement part to be mounted in the neighborhood of the projection of the single lens reflex camera;
    a see-through window for direction light from an eyepiece of the camera; and
    an outer face part surrounding said see-through window so as to form a light shielding hood;
    said outer face part being formed so as not to protrude beyond the contour of said projection with at least a part of said outer face part being made to coincide with said contour of the projection of the camera.

7. An eye-cup according to claim 6, wherein said camera includes an eyepiece frame of the camera and wherein said engagement part of said eye-cup engages with said eyepiece frame of the camera.

8. An eye-cup for a camera including a viewfinder, comprising:
    an inner wall part and an outer wall part made of a soft and elastic material for forming a light shielding hood, and
    an engagement part to be mounted on the camera, formed only on the inner wall part; wherein the inner wall part and the outer wall part of the side opposite to the engagement part are bent almost in a U-form and connected to each other, while a hole is formed between the inner wall part and the outer wall part.

9. An eye-cup according to claim 8, wherein said eye-cup is formed as one body.

10. An eye-cup according to claim 8, wherein said camera includes an eyepiece frame of the camera and wherein said engagement part of said eye-cup engages with said eyepiece frame of the camera.

11. An eye-cup for a camera including a viewfinder, comprising:
    an inner wall part and an outer wall part made of a soft and elastic material for forming a light shielding hood, and
    a hard material having an engagement part to be mounted on the camera, fixed on said inner wall part, wherein
    said inner wall part and said outer wall part at the side opposite to the engagement part are bent almost in a U-form and connected to each other, while a hole is formed between said inner wall part and said outer wall part.

12. An eye-cup according to claim 11, wherein said inner wall part and said outer wall part of the eye-cup are formed as one body.

13. An eye-cup according to claim 11, wherein said camera includes an eyepiece frame of the camera and wherein said engagement part of said eye-cup engages with said eyepiece frame of the camera.

14. An eye-cup according to claim 13, wherein said engagement part is formed like a rib.

15. An eye-cup according to claim 11, wherein said hard material is hard plastics.

16. An eye-cup according to claim 11, wherein said hard material is joined to the whole circumference of the inner wall part and the outer wall part so as to keep the hole in a hermetic state.

* * * * *